(12) United States Patent
Chauk

(10) Patent No.: US 7,759,423 B2
(45) Date of Patent: *Jul. 20, 2010

(54) POLYMER POLYOLS WITH ULTRA-HIGH SOLIDS CONTENTS

(75) Inventor: Shriniwas S. Chauk, Charleston, WV (US)

(73) Assignee: Bayer MaterialScience LLC, Pittsburgh, PA (US)

( * ) Notice: Subject to any disclaimer, the term of this patent is extended or adjusted under 35 U.S.C. 154(b) by 414 days.

This patent is subject to a terminal disclaimer.

(21) Appl. No.: 10/909,493

(22) Filed: Aug. 2, 2004

(65) Prior Publication Data

US 2006/0025492 A1    Feb. 2, 2006

(51) Int. Cl.
*C08G 18/63* (2006.01)

(52) U.S. Cl. .......... 524/762; 252/182.24; 524/765; 524/769; 524/773

(58) Field of Classification Search .......... 528/75; 525/123; 524/762, 765, 769, 773; 252/182.24
See application file for complete search history.

(56) References Cited

U.S. PATENT DOCUMENTS

| | | | |
|---|---|---|---|
| 3,304,273 A | 2/1967 | Stamberger | 260/2.5 |
| 3,383,351 A | 5/1968 | Stamberger | 260/33.2 |
| 3,652,639 A | 3/1972 | Pizzini et al. | 260/465.4 |
| 3,823,201 A | 7/1974 | Pizzini et al. | 260/861 |
| 3,850,861 A | 11/1974 | Fabris et al. | 260/2.5 BE |
| 3,931,092 A | 1/1976 | Ramlow et al. | 260/33.4 R |
| RE28,715 E | 2/1976 | Stamberger | 260/33.2 R |
| RE29,118 E | 1/1977 | Stamberger | 260/2.5 BE |
| 4,014,846 A | 3/1977 | Ramlow et al. | 260/33.2 R |
| 4,093,573 A | 6/1978 | Ramlow et al. | 260/2.5 BE |
| 4,148,840 A | 4/1979 | Shah | 260/859 R |
| 4,172,825 A | 10/1979 | Shook et al. | 260/33.2 R |
| 4,208,314 A | 6/1980 | Priest et al. | 260/33.2 R |
| 4,242,249 A | 12/1980 | Van Cleve et al. | 260/33.2 R |
| 4,342,840 A | 8/1982 | Kozawa et al. | 521/137 |
| 4,390,645 A | 6/1983 | Hoffman et al. | 521/137 |
| 4,394,491 A | 7/1983 | Hoffman | 525/452 |
| 4,454,255 A | 6/1984 | Ramlow et al. | 521/137 |
| 4,458,038 A | 7/1984 | Ramlow et al. | 521/137 |
| 4,460,715 A | 7/1984 | Hoffman et al. | 521/137 |
| 4,550,194 A | 10/1985 | Reichel et al. | 560/200 |
| 4,652,589 A | 3/1987 | Simroth et al. | 521/137 |
| 4,745,153 A | 5/1988 | Hoffman | 524/762 |
| RE32,733 E | 8/1988 | Simroth et al. | 521/137 |
| RE33,291 E | 8/1990 | Ramlow et al. | 521/137 |
| 4,997,857 A | 3/1991 | Timberlake et al. | 521/116 |
| 5,196,476 A | 3/1993 | Simroth | 524/769 |
| 5,268,418 A * | 12/1993 | Simroth | 524/765 |
| 5,814,699 A | 9/1998 | Kratz et al. | 525/53 |
| 5,990,185 A | 11/1999 | Fogg | 521/112 |
| 6,455,603 B1 | 9/2002 | Fogg | 521/137 |
| 6,624,209 B2 * | 9/2003 | Kawamoto et al. | 521/137 |
| 7,160,975 B2 * | 1/2007 | Adkins et al. | 528/75 |
| 2003/0181598 A1 | 9/2003 | Heyman et al. | 525/242 |

FOREIGN PATENT DOCUMENTS

| | | |
|---|---|---|
| EP | 786 480 | 7/2003 |
| GB | 1126025 | 9/1968 |
| JP | 48-101494 | 12/1973 |
| JP | 52-5887 | 1/1977 |

\* cited by examiner

*Primary Examiner*—John Cooney
(74) *Attorney, Agent, or Firm*—N. Denise Brown; Noland J. Cheung

(57) ABSTRACT

The present invention relates to ultra-high solids content polymer polyols which have good filterability while maintaining a reasonable viscosity, and to a process for the preparation of these ultra-high solids contents polymer polyols. These polymer polyols comprise the free-radical polymerization product of (A) a base polyol, (B) a pre-formed stabilizer, (C) at least one ethylenically unsaturated monomer, (D) at least one free-radical polymerization initiator, and (E) at least one chain transfer agent. The solids contents varies from 60% to about 85% by weight.

25 Claims, No Drawings

POLYMER POLYOLS WITH ULTRA-HIGH SOLIDS CONTENTS

BACKGROUND OF THE INVENTION

The present invention relates to polymer polyols which contain ultra-high levels of solids and to a process for their preparation. This invention also relates to a process for the production of polyurethane foams from these ultra-high solids polymer polyols, and to the resultant foams Polymer polyol compositions suitable for use in producing polyurethane foams, elastomers and the like, and the polyurethanes, are commercial products. The two major types of these polyurethane foams are termed slabstock and molded. Slabstock foams are used in the carpet, furniture and bedding industries. Primary uses of slabstock foam are as carpet underlay and furniture padding. In the molded foam area, high resiliency (HR) molded foam is the foam type generally made. HR molded foams are used in the automotive industry for a breadth of applications ranging from molded seats to energy-absorbing padding and the like.

The basic patents relating to such polymer polyol compositions are Starnberger, U.S. Pat. No. Re. 28,715 (reissue of U.S. Pat. No. 3,383,351) and U.S. Pat. No. Re. 29,118 (reissue of U.S. Pat. No. 3,304,273). As described therein, a stable dispersion of polymer particles in a polyol can be produced by polymerizing one or more ethylenically unsaturated monomer dissolved or dispersed in a polyol in the presence of a free radical catalyst.

Initially, the primary polymer polyol compositions accepted commercially used acrylonitrile in its manufacture. Many of these compositions possessed undesirably high viscosities for certain applications. More recently, acrylonitrile-styrene monomer mixtures have been used commercially to make the polymer component of polymer polyols. The expanding demand for polymer polyols has highlighted several product needs and this has spawned additional advances in technology.

Polymer polyols derived from such high styrene monomer mixtures appear incapable of satisfying ever-increasing market needs, which include rigorous stability requirements and increased load-bearing characteristics in foams. Polymer polyols with increased load-bearing characteristics can be obtained by increasing their polymer or solid contents. Solid contents of 30 to 60 weight percent, or higher, are desired. Yet, the art has not been capable of increasing solid contents without reducing the stability of the polymer polyol and undesirably increasing its viscosity.

Employment of high styrene monomer mixtures and high solid contents' polymer polyols, by prior practices, generally resulted in undesirably high viscosity polymer polyols and/or poor filterability. Regardless of the solids level, the viscosity of a polymer polyol should be sufficiently low for ease of handling during its manufacture, and the filterability should be 100% in 150-mesh and 700-mesh filtration tests. In addition, the viscosity should facilitate transport, handling and, ultimately, adequate processability, in the employed foam processing equipment. Because of increased usage of sophisticated mixing systems, such as impingement systems, excessive viscosity of the polymer polyol is becoming a significant problem. The need for lower viscosity polymer polyols with acceptable filterability is apparent to satisfy these increased demands in the art.

High solids polymer polyols are of increasing importance in this market place due to the increasing demand for higher solids foam formulations. These are particularly important in areas such as, for example, bolster formulations, rigid foams, packaging foams, high-load carpet underlay foams, energy management foams and headliner applications.

As indicated, polymer polyol stability is a concern to makers of polyurethanes. At one time, seediness or filterability, a measure of stability of polymer polyols, was not a major issue in commercial practices. However, advances in the state of the art of polyurethane production have resulted in revisions in polymer polyol stability criteria, especially in the molded foam area.

With commercial developments in sophisticated, high-speed and large-volume equipment and systems for handling, mixing and reacting polyurethane-forming ingredients have evolved the need for highly stable and low viscosity polymer polyols. Polymer polyols have certain minimum requirements for satisfactory processing in such sophisticated foam equipment. Typically, the prime requirement is that the polymer polyols possess sufficiently small particles so that filters, pumps and the like do not become plugged or fouled in relatively short periods of time. A polymer polyol that exhibits 100% filterability in 150-mesh and 700-mesh filtration tests is generally considered industry standard by polymer polyol customers.

Though there have been advances in reduction in viscosity and increase in solids of polymer polyols, there remains a need for improvement in higher solids polymer polyols while maintaining a low viscosity and good filterability. Greater increases in solids contents of polymer polyols are needed to meet market demands. More importantly, there is a need for technology in polymer polyols that maximizes viscosity reduction while also providing a viable mechanism to higher solids content.

U.S. Pat. No. 4,208,314 describes low viscosity polymer polyols made from acrylonitrile-styrene monomer mixtures. These polymer polyols are convertible to low density, water-blown polyurethane foams having reduced scorch, especially with relatively low acrylonitrile-to-styrene ratios. This reference also discloses a process for making polymer polyols with reduced particulates. These polymer polyols have from 10 to 30% by weight of solids.

Enhanced stability of polymer polyols is believed to be provided by the presence of a minor amount of a graft or addition copolymer formed in situ from growing polymer chains and polyol molecules. Some prior approaches incorporate small amounts of unsaturation into the polyol in addition to that inherently present in the polyoxyalkylene polyols typically used in forming polymer polyols. It was believed that improved stability resulted due to an increased amount of an addition copolymer stabilizer expected to be formed. U.S. Pat. Nos. 3,652,639, 3,823,201, and 3,850,861, British Patent 1,126,025 and Japanese Patent Nos. 52-80919 and 48,101494 utilize this approach. The use of "stabilizer precursors," also termed a "macromer" that contains a particular level of reactive unsaturation, is based on the expectation that during polymerization, in the preparation of the polymer polyol, adequate amounts of stabilizer will be formed by the addition polymerization of the precursor stabilizer with a growing polymer chain.

The general concept of using stabilizer precursors in polymerization is disclosed in, for example, U.S. Pat. Nos. 4,454, 255 and 4,458,038. The macromer in these patents may be obtained by reacting a polyol with a compound having reactive ethylenic unsaturation such as, for example, maleic anhydride or fumaric acid. Another reference which describes this technique is U.S. Pat. No. 4,460,715. The reactive unsaturation in the '715 stabilizer is provided by an acrylate or methacrylate moiety.

U.S. Pat. No. 4,242,249 discloses improved polymer polyols prepared by utilizing certain preformed dispersants or preformed stabilizers. These polymer polyols provide stability satisfactory for commercial production, and use of at least one of the following: (1) higher amounts of styrene or other comonomer when acrylonitrile copolymer polymer polyols are being prepared, (2) higher polymer contents (i.e. about 10 to about 40% by weight) or (3) lower molecular weight polyols.

Other references which describe stabilizer precursors (or macromers) for polymer polyols include, for example, U.S. Pat. Nos. 4,550,194, 4,652,589, and 4,997,857. The stabilizer precursors of U.S. Pat. No. 4,997,857 are characterized by these four features: (1) they are prepared from a starting polyol having a functionality greater than 4; (2) they have at least 60% retained unsaturation; (3) they have viscosities greater than 2000 centipoise at 25° C.; and (4) the starting polyol is capped with ethylene oxide and/or the adduct formed between the starting polyol and the a reactive unsaturated compound is capped with ethylene oxide.

Other references which describe polymer polyols and/or processes of making polymer polyols include, for example, Simroth et al., U.S. Pat. No. Re. 32,733; Ramlow et al., U.S. Pat. No. 3,931,092; Ramlow et al., U.S. Pat. No. 4,014,846; Ramlow et al., U.S. Pat. No. 4,093,573; Shah, U.S. Pat. No. 4,148,840; Shook et al., U.S. Pat. No. 4,172,825; Kozawa et al., U.S. Pat. No. 4,342,840; Hoffman et al., U.S. Pat. No. 4,390,645; Hoffman, U.S. Pat. No. 4,394,491; Ramlow et al., U.S. Pat. No. 4,454,255; Ramlow et al., U.S. Pat. No. 4,458,038; and Hoffman, U.S. Pat. No. 4,745,153.

A pre-formed stabilizer (PFS) is particularly useful for preparing a polymer polyol having a lower viscosity at a high solids content. In the pre-formed stabilizer processes, a macromer is reacted with monomers to form a co-polymer of composed of macromer and monomers. These co-polymers comprising a macromer and monomers are commonly referred to as pre-formed stabilizers (PFS). Reaction conditions may be controlled such that a portion of the co-polymer precipitates from solution to form a solid. In many applications, a dispersion having a low solids content (e.g., 3 to 15% by weight) is obtained. Preferably, the reaction conditions are controlled such that the particle size is small, thereby enabling the particles to function as "seeds" in the polymer polyol reaction.

For example, U.S. Pat. No. 5,196,476 discloses a pre-formed stabilizer composition prepared by polymerizing a macromer and one or more ethylenically unsaturated monomers in the presence of a free-radical polymerization initiator and a liquid diluent in which the pre-formed stabilizer is essentially insoluble. EP 0,786,480 discloses a process for the preparation of a pre-formed stabilizer by polymerizing, in the presence of a free-radical initiator, from 5 to 40% by weight of one or more ethylenically unsaturated monomers in the presence of a liquid polyol comprising at least 30% by weight (based on the total weight of the polyol) of a coupled polyol which may contain induced unsaturation. These pre-formed stabilizers can be used to prepare polymer polyols which are stable and have a narrow particle size distribution. The coupled polyol is necessary to achieve a small particle size in the pre-formed stabilizer, which preferably ranges from 0.1 to 0.7 micron. U.S. Pat. Nos. 6,013,731 and 5,990,185 also disclose pre-formed stabilizer compositions comprising the reaction product of a polyol, a macromer, at least one ethylenically unsaturated monomer, and a free radical polymerization initiator.

Chain transfer agents, also commonly called reaction moderators or polymer control agents, are well known and are commonly used in the preparation of polymer polyols as is described in, for example, U.S. Pat. No. Re 33,291, (reissue of U.S. Pat. No. 4,454,255), U.S. Pat. No. 4,652,489, U.S. Pat. No. 5,196,476, U.S. Pat. No. 5,814,699, U.S. Pat. No. 5,990,185, and U.S. Pat. No. 6,455,603. Preformed stabilizers are also well known and described in the preparation of polymer polyols such as in, for example, U.S. Pat. Nos. 5,196,476 and 5,990,185, the disclosures of which are herein incorporated by reference.

The polymer polyols described in all of these references are broadly disclosed as containing from 30 to 60% by weight solids. Most of the examples of these references use about 45% by weight of solids. However, Example 11 of U.S. Pat. No. 6,455,603 prepares a polymer polyol with about 50% by weight solids, and Example 8 of U.S. Pat. No. 5,196,476 prepares a polymer polyol with about 59.9% by weight solids. Examples 7 and 6 of the '476 patent prepare polymer polyols with about 55% and 50% by weight solids, respectively. The viscosity of the resultant polymer polyol increases by about 70% from Example 6 (50% solids) to Example 7 (55% solids), and filterability thru a 700 mesh screen drops from 100% to 40%. The viscosity of polymer polyol increases by about 122% from Example 6 (50% solids) to Example 8 (59.9% solids) and filterability thru a 700 mesh screen drops from 100% to 19%.

In accordance with the present invention, it has now been found that solids levels of greater than 60% can be formed in polymer polyols while maintaining reasonable viscosities and very good filterability. Until now, the ability to prepare ultra-high solids polymer polyols while maintaining good filterability and reasonable viscosities have not been attainable. As seen in U.S. Pat. No. 5,196,476, the filterability is poor in the example containing 59.9% solids.

SUMMARY OF THE INVENTION

This invention relates to stable, ultra-high solids polymer polyol compositions and to a process for the preparation of these ultra-high solids polymer polyols. The present invention also relates to a process for the production of polyurethane foams from these ultra-high solids polymer polyols and to the resultant polyurethane foams.

The ultra-high solids polymer polyols of the present invention are the free-radical polymerization product of (A) a base polyol, (B) a high potency preformed stabilizer, and (C) at least one ethylenically unsaturated monomer, in the presence of (D) a free-radical polymerization initiator, preferably in a concentration of no more than 2.0% by weight, based on the weight of the total monomer, and (E) a chain transfer agent.

In accordance with the present invention, it is preferred that these ultra-high solids polymer polyols have solids contents of at least 60% by weight, preferably greater than 60% by weight, more preferably of at least 60.05% by weight, and most preferably of at least 60.10% by weight.

It is also preferred that these stable, ultra-high solids polymer polyols have a kinematic viscosity, in Centistokes or cSt, equal to or less than:

$$(X\, e^{[-4.5 \times LN(1-(Y/100))]})$$

wherein:
X: represents the kinematic viscosity of the base polyol in cSt,
Y: represents the total solids content expressed as weight percent,
LN: represents the logarithm to natural base, and, the polymer polyol exhibits product stability such that essentially 100% passes through a 150 mesh screen and an exceptionally high amount, preferably at least about 99% and most preferably about 100% passes through a 700 mesh screen.

The process of the present invention for preparing these stable ultra-high solids polymer polyols comprises (1) free-radically polymerizing (A) a base polyol, (B) a high potency preformed stabilizer and (C) at least one ethylenically unsaturated monomer, in the presence of (D) a free-radical polymerization initiator, and (E) a chain transfer agent.

The process for the production of polyurethane foams comprises (I) reacting (1) a polyisocyanate component, with (2) an isocyanate-reactive component comprising the stable, ultra-high solids polymer polyols of the present invention, in the presence of (3) at least one catalyst, and (4) at least one blowing agent.

The polyurethane foams of the present invention comprise the reaction product of (1) a polyisocyanate component, with (2) an isocyanate-reactive component comprising the stable, ultra-high solids polymer polyols of the present invention, in the presence of (3) at least one catalyst, and (4) at least one blowing agent.

DETAILED DESCRIPTION OF THE INVENTION

As used herein, the following terms shall have the following meanings.

The term pre-formed stabilizer is defined as an intermediate obtained by reacting a macromer containing reactive unsaturation (e.g. acrylate, methacrylate, maleate, etc.) with monomers (i.e. acrylonitrile, styrene, methyl methacrylate, etc.), optionally in a diluent or a solvent (i.e. methanol, isopropanol, toluene, ethylbenzene, polyether polyols, etc.) to give a co-polymer (dispersion having e.g. a low solids content (e.g. <20%), or soluble grafts, etc.).

The term "monomer" means the simple unpolymerized form of chemical compound having relatively low molecular weight, e.g., acrylonitrile, styrene, methyl methacrylate, and the like.

The phrase "free radically polymerizable ethylenically unsaturated monomer" means a monomer containing ethylenic unsaturation (>C=C<, i.e. two double bonded carbon atoms) that is capable of undergoing free radically induced addition polymerization reactions.

The term "stability" means the ability of a material to maintain a stable form such as the ability to stay in solution or in suspension.

The phrase "polymer polyol" refers to such compositions which are produced by polymerizing one or more ethylenically unsaturated monomers dissolved or dispersed in a polyol in the presence of a free radical catalyst to form a stable dispersion of polymer particles in the polyol. These polymer polyols have the valuable property of imparting to, for example, polyurethane foams and elastomers produced therefrom, higher load-bearing properties than are provided by the corresponding unmodified polyols.

As used herein "viscosity" is in centistokes (cSt) measured at 25° C. on a Cannon Fenske viscometer.

As used herein, "organic polyisocyanate" refers to organic compounds that contain at least two isocyanato groups and include the hydrocarbon diisocyanates (e.g., the alkylene diisocyanates and the arylene diisocyanates), as well as known triisocyanates and polymethylene poly(phenylene isocyanates). Illustrative polyisocyanates are: 2,4-diisocyanatotoluene, 2,6-diisocyanatotoluene, methylene bis(4-cyclohexyl isocyanate), 1,2-diisocyanatoethane, 1,3-diisocyanatopropane, 1,2-diisocyanatopropane, 1,4-diisocyanatobutane, 1,5-diisocyanatopentane 1,6-diisocyanatohexane, bis(3-isocyanatopropyl)ether, bis(3-isocyanatopropyl) sulfide, 1,7-diisocyanatoheptane, 1,5-diisocyanato-2,2-dimethylpentane, 1,6-diisocyanato-3-methoxyhexane, 1,8-diisocyanatooctane, 1,5-diisocyanato-2,2,4-trimethylpentane, 1,9-diisocyanatononane, 1,10-diisocyanatopropyl(ether) of 1,4-butylene glycol, 1,11-diisocyanatoundecane, 1,12-diisocyanatododecane bis (isocyanatohexyl)sulfide, 1,4-diisocyanatobenzene, 2,4-diisocyanatotolylene, 2,6-diisocyanatotolylene, 1,3-diisocyanato-o-xylene, 1,3-diisocyanato-m-xylene, 1,3-diisocyanato-p-xylene, 2,4-diisocyanato-1-chlorobenzene, 2,4-diisocyanato-1-nitrobenzene, 2,5-diisocyanato-1-nitrobenzene, 4,4-diphenylmethylene diisocyanate, 3,3-diphenyl-methylene diisocyanate, polymethylene poly(phenylene isocyanates) and mixtures thereof. The preferred polyisocyanates are a mixture of 80% 2,4-tolylene diisocyanate and 20% 2,6-tolylene diisocyanate and polymethylene poly(phenyleneisocyanates).

The phrase "ultra-high solids" as used herein, in reference to a polymer polyol, means that the content of solid polymer in the polymer polyols is greater than 60% by weight, preferably greater than 60.05% by weight, more preferably at least 60.05% by weight, and most preferably at least 60.10% by weight, based on the total weight of the polymer polyol.

Suitable polyols to be used as the base polyols in the present invention include, for example, polyether polyols. Suitable polyether polyols include those having a functionality of at least about 2, preferably at least about 2, more preferably at least about 2, and most preferably at least about 2. The functionality of suitable polyether polyols is less than or equal to about 8, preferably less than or equal to about 7, more preferably less than or equal to 6, and most preferably less than or equal to about 5. The suitable polyether polyols may also have functionalities ranging between any combination of these upper and lower values, inclusive. The OH numbers of suitable polyether polyols is at least about 10, preferably at least about 15, more preferably at least about 15, and most preferably at least about 20. Polyether polyols typically also have OH numbers of less than or equal to about 1000, preferably less than or equal to about 500, more preferably less than or equal to about 200, and most preferably less than or equal to about 75. The suitable polyether polyols may also have OH numbers ranging between any combination of these upper and lower values, inclusive. The (number average) molecular weights of suitable polyether polyols is typically at least about 100, preferably at least about 225, more preferably at least about 560, and most preferably at least about 1,500. Polyether polyols typically have (number average) molecular weights of less than or equal to about 45,000, preferably less than or equal to about 26,200, more preferably less than or equal to about 22,500, and most preferably less than or equal to 14,000. The suitable base polyether polyols may also have (number average) molecular weights ranging between any combination of these upper and lower values, inclusive. The polyether polyols used as the base polyol also optionally have low levels of unsaturation. When low unsaturation polyols are used as the base polyol, the unsaturation level of the base polyols is typically at least about 0.001 meq/g, preferably at least about 0.001, and most preferably at least about 0.002. Suitable base polyether polyols also typically have unsaturation levels of less than or equal to 0.1, preferably less than or equal to 0.09 and most preferably less than or equal to 0.08. The suitable base polyether polyols may also have an unsaturation level ranging between any combination of these upper and lower values, inclusive.

These polyether polyols may also have functionalities ranging from about 2 to about 8, preferably from about 2 to about 7, more preferably about 2 to 6, and most preferably from about 2 to about 5; OH numbers ranging from about 10 to 1000, preferably from about 15 to about 500, more preferably from about 15 to about 200, and most preferably from about 20 to about 75; (number average) molecular weights ranging from about 100 to about 45,000, preferably about 225 to about 26,200, more preferably about 560 to about 22,500, and most preferably about 1,500 to about 14,000. In addition, the polyether polyols may optionally have levels of unsaturation ranging from about 0.001 to 0.1, preferably from 0.001 to 0.09, and most preferably from 0.002 to 0.08 meq/gram.

As used herein, the hydroxyl number is defined as the number of milligrams of potassium hydroxide required for the complete hydrolysis of the fully phthalylated derivative prepared from 1 gram of polyol. The hydroxyl number can also be defined by the equation:

$$OH = (56.1 \times 1000 \times f)/\text{mol. wt.}$$

wherein:
OH: represents the hydroxyl number of the polyol,
f: represents the functionality of the polyol, i.e. the average number of hydroxyl groups per molecule of polyol, and
mol. wt. represents the molecular weight of the polyol.

Examples of such compounds include polyoxyethylene glycols, triols, tetrols and higher functionality polyols, polyoxypropylene glycols, triols, tetrols and higher functionality polyols, mixtures thereof, etc. When mixtures as used, the ethylene oxide and propylene oxide may be added simultaneously or sequentially to provide internal blocks, terminal blocks or random distribution of the oxyethylene groups and/or oxypropylene groups in the polyether polyol. Suitable starters or initiators for these compounds include, for example, ethylene glycol, propylene glycol, diethylene glycol, dipropylene glycol, tripropylene glycol, trimethyolpropane, glycerol, pentaerythritol, sorbitol, sucrose, ethylenediamine, toluene diamine, etc. By alkoxylation of the starter, a suitable polyether polyol for the base polyol component can be formed.

Other suitable polyols for the base polyol of the present invention include alkylene oxide adducts of non-reducing sugars and sugar derivatives, alkylene oxide adducts of phosphorus and polyphosphorus acids, alkylene oxide adducts of polyphenols, polyols prepared from natural oils such as, for example, castor oil, etc., and alkylene oxide adducts of polyhydroxyalkanes other than those described above.

Illustrative alkylene oxide adducts of polyhydroxyalkanes include, for example, alkylene oxide adducts of 1,3-dihydroxypropane, 1,3-dihydroxybutane, 1,4-dihydroxybutane, 1,4-, 1,5- and 1,6-dihydroxyhexane, 1,2-, 1,3-, 1,4- 1,6- and 1,8-dihydroxyoctant, 1,10-dihydroxydecane, glycerol, 1,2,4-tirhydroxybutane, 1,2,6-trihydroxyhexane, 1,1,1-trimethylolethane, 1,1,1-trimethylolpropane, pentaerythritol, caprolactone, polycaprolactone, xylitol, arabitol, sorbitol, mannitol, and the like.

Other polyols which can be employed include the alkylene oxide adducts of non-reducing sugars, wherein the alkoxides have from 2 to 4 carbon atoms. Non-reducing sugars and sugar derivatives include sucrose, alkyl glycosides such as methyl glycoside, ethyl glucoside, etc. glycol glucosides such as ethylene glycol glycoside, propylene glycol glucoside, glycerol glucoside, 1,2,6-hexanetriol glucoside, etc. as well as alkylene oxide adducts of the alkyl glycosides as disclosed in U.S. Pat. No. 3,073,788, the disclosure of which is herein incorporated by reference. Other suitable polyols include the polyphenols and preferably the alkylene oxide adducts thereof wherein the alkylene oxides have from 2 to 4 carbon atoms. Among the polyphenols which are suitable include, for example bisphenol A, bisphenol F, condensation products of phenol and formaldehyde, the novolac resins, condensation products of various phenolic compounds and acrolein, including the 1,1,3-tris(hydroxy-phenyl)propanes, condensation products of various phenolic compounds and glyoxal, glutaraldehyde, other dialdehydes, including the 1,1,2,2-tetrakis (hydroxyphenol)ethanes, etc.

The alkylene oxide adducts of phosphorus and polyphosphorus acid are also useful polyols, These include ethylene oxide, 1,2-epoxy-propane, the epoxybutanes, 3-chloro-1,2-epoxypropane, etc. as preferred alkylene oxides. Phosphoric acid, phosphorus acid, the polyphosphoric acids such as, tripolyphosphoric acid, the polymetaphosphoric acids, etc. are desirable for use herein.

Suitable base polyols also include those low unsaturation polyols as described in, for example, U.S. Pat. Nos. 3,278, 457, 6,008,263, and 6,066,683, the disclosures of which are hereby incorporated by reference.

It should also be appreciated that blends or mixtures of various useful polyols may be used if desired. With polyols other than the preferred type, useful monomer contents and monomer or monomers may vary somewhat. Similarly, it may be desirable or even necessary to modify the stabilizer of this invention when such other polyols are used. This can be accomplished by following the criteria discussed hereinafter in connection with the stabilizers used for the preferred polyols.

Suitable preformed stabilizers for the present invention are high potency preformed stabilizers which are known in the art and include without limitation those described in the references discussed herein. Preferred preformed stabilizers include those discussed in, for example, U.S. Pat. No. 4,148, 840 (Shah), U.S. Pat. No. 5,196,476 (Simroth), U.S. Pat. No. 5,268,418 (Simroth), U.S. Pat. No. 5,364,906 (Critchfield) and U.S. Pat. No. 6,013,731 (Holeschovsky et al), the disclosures of which are hereby incorporated by reference.

The term preformed stabilizer is defined as an intermediate obtained by reacting a macromolecule with monomers (i.e. acrylonitrile, styrene, methyl methacrylate, etc.), to give a copolymer (dispersion having a low solids content, e.g. <25% or soluble grafts, etc.). The macromolecule may be obtained by linkage of polyether polyols through coupling with a material such as a polyisocyanate, epoxy resin, etc. or by other means to produce a high molecular weight polyol. The macromolecule preferably contains reactive unsaturation and is, in general, prepared by the reaction of the selected reactive unsaturated compound with a polyol. The terminology "reactive unsaturated compound," refers to any compound capable of forming an adduct with a polyol, either directly or indirectly, and having carbon-to-carbon double bonds which are adequately reactive with the particular monomer system being utilized. More specifically, compounds containing alpha, beta unsaturation are preferred. Suitable compounds satisfying this criteria include the maleates, fumarates, acrylates, and methacrylates. While not alpha, beta unsaturated compounds, polyol adducts formed from substituted vinyl benzenes, such as chloromethylstyrene, likewise may be utilized. Illustrative examples of suitable alpha, beta unsaturated compounds which may be employed to form the precursor stabilizer include maleic anhydride, fumaric acid, dialkyl fumarates, dialkyl maleates, glycol maleates, glycol fumarates, isocyanatoethyl methacrylate, 1,1-dimethyl-m-isopropenylbenzyl-isocyanate, methyl methacrylate, hydroxyethyl methacrylate, acrylic and methacrylic acid and their anhydride, methacroyl chloride and glycidyl methacrylate. The level of ethylenic unsaturation in the precursor stabilizer may vary widely. The minimum and maximum levels of unsaturation both are constricted by the dispersion stability that the precursor stabilizer is capable of imparting to the polymer polyol composition. The specific level of unsaturation utilized further will depend on the molecular weight and functionality of the polyol used to prepare the precursor stabilizer. Optionally, a diluent, solvent, or chain transfer agent may be present.

The high potency preformed stabilizers for the polymer/polyols of the present invention preferably comprise the free radical polymerization product of (1) a free radically polymerizable ethylenically unsaturated monomer and (2) an adduct of a alcohol having the average formula:

$$A(OROX)_{\geq 1}$$

wherein A is a polyvalent organic moiety, the free valence of which is $\geq 1$, R is the divalent residue comprising an alkylene oxide moiety, and X is one or more of an organic moiety containing reactive unsaturation, copolymerizable with (A), and hydrogen, about one of such X is the organic moiety containing reactive unsaturation and the remaining X's are hydrogen, in which the adduct may be further adducted with an organic polyisocyanate.

These high potency preformed stabilizers of the invention are derived from the following composition, comprising:
(1) a macromer or other suitable precursor;
(2) a free radically polymerizable ethylenically unsaturated monomer, preferably acrylonitrile and at least one other ethylenically unsaturated comonomer copolymerizable therewith,
(3) a free radical polymerization initiator;
and
(4) a liquid diluent or chain transfer agent in which (1), (2), and (3) are soluble, but in which the resulting preformed stabilizer is essentially insoluble.

Particularly preferred preformed stabilizers for this invention include, for examples, those high potency preformed stabilizers as described in, for example, U.S. Pat. No. 5,196,476 and U.S. Pat. No. 5,268,418, the disclosure of which is hereby incorporated by reference. Suitable preformed stabilizers can be prepared by reacting a combination of components (1), (2), (3), and (4), above, in a reaction zone maintained at a temperature sufficient to initiate a free radical reaction, and under sufficient pressure to maintain only liquid phases in the reaction zone, for a period of time sufficient to react essentially all or all of (1); and recovering a heterogenous mixture containing the preformed stabilizer dispersed in the diluent.

Suitable compounds to be used as the macromer (i.e. component (1) above) include, for example, compounds which contain reactive unsaturation (e.g. acrylate, methacrylate, maleate, fumarate, isopropenylphenyl, etc.), obtained by reacting compounds containing reactive unsaturation with alcohols having the average formula $A(OROX)_{\geq 1}$. Examples of unsaturation containing compounds include but are not limited to, maleic anhydride, fumaric acid, dialkyl fumarates, dialkyl maleates, glycol maleates, glycol fumarates, isocyanatoethyl methacrylate, methyl methacrylate, hydroxyethyl methacrylate, acrylic and methacrylic acid and their anhydride, methacryl chloride, and glycidyl methacrylate, etc.

The reactive unsaturated compound may also be the reaction product of one or more molecules resulting in a structure with the desired qualities of a reactive unsaturated compound. For example, hydroxymethyl or hydroxyethyl methacrylate can be reacted with a polyol by way of coupling through use of an organic polyisocyanate as described in, for example, U.S. Pat. No. 4,521,546, the disclosure of which is herein incorporated by reference, or by reaction with an unsaturated monoisocyanate such as, for example, 1,1-dimethyl-m-isopropenylbenzyl isocyanate, etc.

Suitable compounds to be used component (2) above, include reactive unsaturated compounds, particularly those that are free radically polymerizable. Some examples of suitable compounds include aliphatic conjugated dienes such as butadiene and isoprene; monovinylidene aromatic monomers such as styrene, $\alpha$-methylstyrene, (t-butyl)styrene, chlorostyrene, cyanostyrene and bromostyrene; $\alpha,\beta$-ethylenically unsaturated carboxylic acids and esters thereof such as acrylic acid, methacrylic acid, methyl methacrylate, ethyl acrylate, 2-hydroxyethyl acrylate, butyl acrylate, itaconic acid, maleic anhydride and the like; $\alpha,\beta$-ethylenically unsaturated nitriles and amides such as acrylonitrile, methacrylonitrile, acrylamide, methacrylamide, N,N-dimethyl acrylamide, N-(dimethylaminomethyl)acrylamide and the like; vinyl esters such as vinyl acetate; vinyl ethers, vinyl ketones, vinyl and vinylidene halides as well as a wide variety of other ethylenically unsaturated materials which are copolymerizable with the aforementioned monomeric adduct or reactive monomer. It is understood that mixtures of two or more of the aforementioned monomers are also suitable employed in making the pre-formed stabilizer. Of the above monomers, the monovinylidene aromatic monomers, particularly styrene, and the ethylenically unsaturated nitriles, particularly acrylonitrile are preferred.

It is preferred that (2) is acrylonitrile and at least one other ethylenically unsaturated comonomer copolymerizable with acrylonitrile. Illustrations of ethylenically unsaturated comonomer copolymerizable with acrylonitrile include styrene and its derivatives, acrylates, methacrylates such as methyl methacrylate, vinylidene chloride, and the like.

It is particularly preferred to utilize acrylonitrile with a comonomer and to maintain a minimum of about 5 to 15 percent by weight acrylonitrile in the system. Styrene will generally be preferred as the comonomer, but methyl methacrylate or other monomers may be employed in place of part or all of the styrene. A preferred monomer mixture (2) used to make the preformed stabilizer composition (B) comprises mixtures of acrylonitrile and styrene. The weight proportion of acrylonitrile can range from about 20 to 80 weight percent of the comonomer mixture, more typically from about 30 to about 40 weight percent, and styrene can accordingly vary from about 80 to about 20 weight percent, more preferably from 70 to 60 weight percent of the mixture. An acrylonitrile to styrene ratio in the monomer mixture of from about 25:75 to 60:40 is particularly preferred, even more particularly about 30:70 to 55:45.

When using a mixture of monomers, it is preferred to use a mixture of two monomers. These monomers are typically used in weight ratios of from 80:20 (styrene:acrylonitrile) to 20:80 (S:AN), and preferably of from 75:25 (S:AN) to 45:55 (S:AN).

The free radical polymerization initiators for useful as component (3) in the suitable preformed stabilizers of the present invention encompass any free radical catalyst suitable for grafting of an ethylenically unsaturated polymer to a polyol. Examples of suitable free-radical polymerization initiators for the present invention include initiators such as, for example, peroxides including both alkyl and aryl hydroperoxides, persulfates, perborates, percarbonates, azo compounds, etc. Some specific examples include catalysts such as hydrogen peroxide, di(t-butyl)-peroxide, t-butylperoxy diethyl acetate, t-butyl peroctoate, t-butyl peroxy isobutyrate, t-butyl peroxy 3,5,5-trimethyl hexanoate, t-butyl perbenzoate, t-butyl peroxy pivalate, t-amyl peroxy pivalate, t-butyl peroxy-2-ethyl hexanoate, lauroyl peroxide, cumene hydroperoxide, t-butyl hydroperoxide, azobis(isobutyronitrile), 2,2'-azo bis-(2-methylbutyronitrile), etc.

Useful catalysts also include, for example, those catalysts having a satisfactory half-life within the temperature ranges used to form the preformed stabilizer, i.e. the half-life should be about 25 percent or less of the residence time in the reactor at a given temperature. Representative examples of useful catalyst species include t-butyl peroxy-2-ethylhexanoate, t-butylperpivalate, t-amyl peroctoate, 2,5-dimethyl-hexane-2,5-di-per-2-ethyl hexoate, t-butylperneodecanoate, and t-butylperbenzoate. Useful also are the azo catalysts such as azobis-isobutyronitrile, 2,2'-azo bis-(2-methylbutyronitrile), and mixtures thereof. The preferred free radical catalysts are peroxides such as tertiary butyl peroctoate.

Suitable catalysts concentrations range from about 0.01 to about 2% by weight, preferably from about 0.05 to 1% by weight, and most preferably 0.05 to 0.5% by weight, based on the total weight of the components (i.e. 100% by weight of the combined weight of the macromer, the ethylenically unsaturated monomer, the free-radical polymerization initiator and, optionally the liquid diluent and/or the chain transfer agent). Up to a certain point, increases in the catalyst concentration result in increased monomer conversion and grafting; but further increases do not substantially increase conversion. Catalyst concentrations which are too high can cause cross-linking in the preformed stabilizer (B). The particular catalyst concentration selected will usually be an optimum value considering all factors, including costs.

The liquid diluent or chain transfer agent (4) in which (1), (2), and (3) are soluble, but in which the resultant preformed stabilizer (B) is essentially insoluble, comprises either a single diluent, chain transfer agent or a mixture thereof. Such diluents can be mono-ols (monohydroxy alcohols), polyols, hydrocarbons, ethers, and the like liquids. As long as the diluent or chain transfer agent does not adversely affect the performance of the preformed stabilizer (B), it is suitable for use in the practice of the invention. Preferred are the mono-ols because of their ease of stripping from the final polymer/polyol composition. Mixtures of mono-ol and polyol may be used as diluents. In that case, the polyol need not be stripped off. The choice of mono-ol is not narrowly critical. It should not form two phases at reaction conditions and should be readily stripped from the final polymer polyol.

The selection of mono-ol is typically an alcohol containing at least one carbon atoms, such as methanol, ethanol, n-propanol, iso-propanol, n-butanol, sec.-butanol, t-butanol, n-pentanol, 2-pentanol, 3-pentanol, and the like, and mixtures of the same. The preferred mono-ol is isopropanol. The concentration of polyol in the diluent or chain transfer agent (4) if used, is limited to an amount below which gelling occurs in preformed stabilizer (B).

The polyol components suitable as diluents/chain transfer agent (4) in the present invention include typically the alkylene oxide adduct of A(OH)$_{>4}$ described above. Though the polyol used in diluent (4) can encompass the variety of polyols described above, including the broader class of polyols described in U.S. Pat. No. 4,242,249, patented Dec. 30, 1980, at column 7, line 39 through column 9, line 10, which disclosure is incorporated herein by reference, it is preferred that the polyol component of diluent (4) be the same as or equivalent to the polyol used in the formation of precursor used to prepare the high potency preformed stabilizer (PFS).

If a mixture of a mono-ol and a polyol is used as diluent/chain transfer agent (4) it is desirable that the polyol comprise the minor amount by weight of diluent/chain transfer agent (4) and the mono-ol the major amount. In the usual case, the polyol will comprise less than about 30 weight percent of the weight of diluent (4). Preferably, the polyol comprises less than about 20 weight percent of diluent/chain transfer agent (4), most preferably less than about 15 weight percent. In any case, the polyol portion will be below that concentration at which gelling occurs in preparing the high potency preformed stabilizer (B).

Because of the number of components, the variability of their concentration in the feed, and the variability of the operating conditions of temperature, pressure, and residence or reaction times, a substantial choice of these is possible while still achieving the benefits of the invention. Therefore, it is prudent to test particular combinations to confirm the most suitable operating mode for producing a particular final polymer polyol product.

In general, the amount of the components in the formulation, on a weight percent of the total formulation for forming preformed stabilizer (B), is as follows:

| Component of Formulation | Amount, weight % |
| --- | --- |
| 1 | about 10 to 40 |
| 2 | about 10 to 30 |
| 3 | about 0.01 to 2 |
| 4 | about 30 to 80 |

The process for producing the high potency preformed stabilizer (B) is similar to the process for making the polymer polyol. The temperature range is not critical and may vary from about 80° C. to about 150° C., preferably from 90° C. to 140° C., more preferably from 100° C. to 135° C., and most preferably from 110° C. to 130° C. The catalyst and temperature should be selected so that the catalyst has a reasonable rate of decomposition with respect to the hold-up time in the reactor for a continuous flow reactor or the feed time for a semi-batch reactor.

The mixing conditions employed are those obtained using a back mixed reactor (e.g.—a stirred flask or stirred autoclave). The reactors of this type keep the reaction mixture relatively homogeneous and so prevent localized high monomer to macromer ratios such as occur in tubular reactors, where all of the monomer is added at the beginning of the reactor.

The high potency preformed stabilizer (B) of the present invention comprise dispersions in the diluent/chain transfer agent and any unreacted monomer in which the high potency preformed stabilizer (B) is probably present as individual molecules or as groups of molecules in "micelles," or on the surface of small polymer particles.

The combination of conditions selected should not lead to cross-linking or gel formation in the preformed stabilizer (B) which can adversely affect the ultimate performance in making the polymer polyol composition. Combinations of too low a diluent/chain transfer agent concentration, too high a macromer (1) and/or monomer concentration, too high a catalyst concentration, too long of a reaction time, and too much unsaturation in macromer (1) can result in ineffective preformed stabilizer (B) from cross-linking or gelling.

The amount of high potency preformed stabilizer (B) in the present invention is typically at least about 0.25%, preferably at least about 2%, more preferably at least about 4% and most preferably at least about 5% by weight, based on the total weight of the polymer polyol. It is also typical to use the high potency preformed stabilizer (B) in accordance in the present invention in amounts of 35% by weight or less, preferably of 32% by weight or less, more preferably of 27% by weight of less, and most preferably of 22% by weight or less, based on the total weight of the polymer polyol. The amount of high potency preformed stabilizer in the polymer polyols of the present invention may range from any combination of these upper and lower values, inclusive, e.g. from 0.25% to 35%, preferably from 2% to 32%, more preferably from 4% to 27% and most preferably from 5% to 22% by weight, based on the total weight of the polymer polyol.

In accordance with the present invention, it is preferably that silane modified compounds are not used as precursors in the preparation of preformed stabilizers. These include precursors such as, for example, those as described in EP 162,589, the disclosure of which is hereby incorporated by reference. The previously described high potency preformed stabilizers are preferably used in the absence of the silane based preformed stabilizers of EP 162,589.

Suitable compounds to be used as the ethylenically unsaturated monomers, i.e. component (C) the present invention include, for example, those ethylenically unsaturated monomers described above with respect to the preformed stabilizer. Suitable monomers include, for example, aliphatic conjugated dienes such as butadiene and isoprene; monovinylidene aromatic monomers such as styrene, α-methyl-styrene, (t-butyl)styrene, chlorostyrene, cyanostyrene and bromostyrene; α,β-ethylenically unsaturated carboxylic acids and esters thereof such as acrylic acid, methacrylic acid, methyl methacrylate, ethyl acrylate, 2-hydroxyethyl acrylate, butyl actylate, itaconic acid, maleic anhydride and the like; α,β-ethylenically unsaturated nitriles and amides such as acrylonitrile, methacrylonitrile, acrylamide, methacrylamide, N,N-dimethyl acrylamide, N-(dimethylaminomethyl)acrylamide and the like; vinyl esters such as vinyl acetate; vinyl ethers, vinyl ketones, vinyl and vinylidene halides as well as a wide variety of other ethylenically unsaturated materials which are copolymerizable with the aforementioned monomeric adduct or reactive monomer. It is understood that mixtures of two or more of the aforementioned monomers are also suitable employed in making the pre-formed stabilizer. Of the above monomers, the monovinylidene aromatic monomers, particularly styrene, and the ethylenically unsaturated nitriles, particularly acrylonitrile are preferred. In accordance with this aspect of the present invention, it is preferred that these ethylenically unsaturated monomers include styrene and its derivatives, acrylonitrile, methyl acrylate, methyl methacrylate, vinylidene chloride, with styrene and acrylonitrile being particularly preferred monomers.

It is preferred styrene and acrylonitrile are used in sufficient amounts such that the weight ratio of styrene to acrylonitrile (S:AN) is from about 100:0 to 40:60, preferably from about 80:20 to 50:50, more preferably from about 75:25 to 55:45, and most preferably from about 75:25 to 60:40. These ratios are suitable for polymer polyols and the processes of preparing them, regardless of whether they comprise the ethylenically unsaturated macromers or the pre-formed stabilizers of the present invention.

Overall, the solids content present in the polymer polyols of the present invention is greater than about 60% by weight, preferably at least about 60%, more preferably at least about 60% and most preferably at least about 60% by weight, based on the total weight of the polymer polyol. The solids content present in the polymer polyols is about 85% by weight or less, preferably about 82% by weight or less, more preferably about 78% by weight or less, and most preferably about 75% by weight or less, based on the total weight of the polymer polyol. The polymer polyols of the present invention typically has a solids content ranging between any combination of these upper and lower values, inclusive, e.g. from about 60% to 85% by weight, preferably from about 60% to 82% by weight, more preferably from about 60% to about 78% by weight, and most preferably from about 60% to about 75% by weight, based on the total weight of the polymer polyol.

Suitable free-radical initiators to be used as component (D) in the present invention include, for example, those as described previously for the formation of the preformed stabilizers. Examples of suitable free-radical polymerization initiators for the present invention include initiators such as, for example, peroxides including both alkyl and aryl hydroperoxides, persulfates, perborates, percarbonates, azo compounds, etc. Some specific examples include catalysts such as hydrogen peroxide, di(t-butyl)-peroxide, t-butylperoxy diethyl acetate, t-butyl peroctoate, t-butyl peroxy isobutyrate, t-butyl peroxy 3,5,5-trimethyl hexanoate, t-butyl perbenzoate, t-butyl peroxy pivalate, t-amyl peroxy pivalate, t-butyl peroxy-2-ethyl hexanoate, lauroyl peroxide, cumene hydroperoxide, t-butyl hydroperoxide, azobis(isobutyronitrile), i.e. AIBN, 2,2'-azo bis-(2-methylbutyronitrile), i.e. AMBN, etc.

Useful initiators also include, for example, those catalysts having a satisfactory half-life within the temperature ranges used in forming the polymer polyol. Typically, the half-life should be about 25% or less of the residence time in the reactor at any given time. Preferred initiators for this portion of the invention include acyl peroxides such as didecanoyl peroxide and dilauroyl peroxide, alkyl peroxides such as t-butyl peroxy-2-ethylhexanoate, t-amyl peroxy-2-ethylhexanoate, t-butyl peroxy pivalate, t-amyl peroxy pivalate, di-(2-ethylhexyl)peroxydicarbonate, di-n-propyl peroxydicarbonate, di-sec-butyl peroxydicarbonate, 3-hydroxy-1,1-dimethylbutyl peroxyneodecanoate, α-cumyl peroxyneodecanoate, 3-hydroxy-1,1-dimethylbutyl peroxyneoheptanoate, α-cumyl peroxyneoheptanoate, t-amyl peroxyneodecanoate, 2,5-dimethyl-2,5-di-(2-ethylhexanoylperoxy)hexane, diisononanoyl peroxide, didodecanoyl peroxide, dioctanoyl peroxide, succinic acid peroxide, t-amyl peroctoate, t-butyl perneodecanoate, t-butylperbenzoate and 1,1-dimethyl-3-hydroxybutyl peroxy-2-ethylhexanoate, dibenzoyl peroxide, 1,1,3,3-tetramethylbutyl peroxypivalate, di-(3,5,5-trimethylhexanoyl) peroxide, 1,1,3,3-tetramethylbutyl peroxy-2-ethylhexanoate, and azo catalysts such as azobis(isobutyro-nitrile), 2,2'-azo bis-(2-methoxylbutyronitrile), and mixtures thereof. Most preferred are the acyl and peroxyester peroxides described above and the azo catalysts.

Particularly preferred in the practice of the invention, are the use of azo catalysts and the aforementioned acyl and peroxyester peroxides of the above formula. The acyl and peroxyester peroxides have the unique advantage of effecting the desired degree of polymerization essentially without raising the viscosity of the polymer polyol over that obtained with the azo catalyst. This enhances one's ability to achieve higher solids polymer polyols with good product stability without raising product viscosity. Such acyl and peroxyester peroxides can be used in molar amounts substantially less than the amounts required when using other free radical catalysts in forming the polymer polyols.

Generally speaking, peroxide initiators result in the formation of little to no by-products which can result in solid precipitates in the refining section of a polymer polyol production unit. Such solid by-products are commonly formed by azo initiators such as, for example, AIBN, which forms TMSN (i.e. tetramethylsuccinonitrile). Other drawbacks of azo initiators include the toxicity of TMSN and the difficulty of stripping TMSN from the final product (i.e. polymer polyol). When foams are made from polymer polyols which contain an azo initiator, residues of these can escape and may form an undesirable film on nearby surfaces such as, for example, the inside of an automobile windshield.

The quantity of free-radical initiator used herein is not critical and can be varied within wide limits. In general, the amount of initiator is preferably less than 2.0% by weight, more preferably less than 1.5% by weight, and most preferably less than 1.0% by weight, based on the total weight of the monomers. Increases in catalyst concentration result in increases in monomer conversion up to a certain point, but past this, further increases do not result in substantial increases in conversion. The particular catalyst concentration selected will usually be an optimum value, taking all factors into consideration including costs. When a peroxide initiator is used, it is preferred that the quantity be limited to that which results in polymer polyols having good filterability without undesirable increases in the viscosity.

Suitable chain transfer agents for use as component (E) in the present invention include, for example, known to be useful in polymer polyols and the processes of preparing polyols such as those described in, for example, U.S. Pat. Nos. 3,953, 393, 4,119,586, 4,463,107, 5,324,774, 5,814,699 and 6,624, 209, the disclosures of which are herein incorporated by reference. Some examples of suitable compounds to be used as chain transfer agents include mercaptans (preferably alkyl mercaptans), alcohols, halogenated hydrocarbons (alkyl halides), ketones, enol-ethers and alkyl-substituted tertiary amines. Chain transfer agents are also commonly referred to as reaction moderators and/or as polymer control agents. These are known to control the molecular weight of the copolymerizate.

Suitable chain transfer agents include, for example, mercaptans including benzylmercaptan as well as alkyl mercaptans such as, for example, dodecylmercaptan, butylmercaptan, octylmercaptan, laurylmercaptan, cyclohexylmercaptan, etc., alkyl-substituted tertiary amines include compounds such as, for example, triethylamine, tripropylamine, tributylamine, N,N-diethylethanolamine, N-methylmorpholine, N-ethylmorpholine, N,N-diethylpiperazine, etc., alcohols include, for example, isopropanol, ethanol, methanol, tert-butanol, allyl-alcohol, etc., enol-ethers include, for example, (cyclohex-3-enylidenemethoxymethyl)-benzene, etc., halogenated hydrocarbons including, for example, carbon tetrachloride, carbon tetrabromide, chloroform, methylene chloride, etc. Other known chain transfer agents include compounds such as, for example, ethylbenzene and toluene. In accordance with the present invention, preferred chain transfer agents include isopropanol, ethanol, tert-butanol, toluene, ethylbenzene, triethylamine, dodecylmercaptan, octadecylmercaptan, etc.

Chain transfer agents are employed in amounts of from 0.1% by weight, preferably of at least about 1%, more preferably at least about 2% and most preferably at least about 3% by weight. Chain transfer agents are also employed in amounts of less than or equal to 30% by weight, preferably less than or equal to about 26%, more preferably less than or equal to 24% and most preferably less than or equal to about 21% by weight. The weight basis for the chain transfer agent is the total weight of all the components charged to reactor. The chain transfer agent may be employed in any amount ranging between any combination of these lower and upper values, inclusive, e.g., from 0.1% to about 30% by weight, preferably from about 1% to about 26% by weight, more preferably from about 2% to about 24% by weight and most preferably from about 3% to about 21% by weight.

The total amount of chain transfer agent (CTA) present in the polymer polyols of this invention is comprised of: (i) chain transfer agent which is present in the preformed stabilizer and that is inherently present in the polymer polyol due to the preparation of the polymer polyol from the preformed stabilizer, and/or (ii) chain transfer agent which is added separately from the preformed stabilizer to the preparation of the polymer polyol.

The total amount of chain transfer agent (CTA) present in the polymer polyols of the present invention ranges from greater than about 0.1% to about 30% by weight, preferably from about 1% to about 26% by weight, more preferably from about 2% to about 24% by weight and most preferably from about 3% to about 21% by weight, based on the total weight of the polymer polyol. The total amount of chain transfer agent is comprised of: (i) chain transfer agent which is present in the preformed stabilizer and which is carried into the polymer polyol by the PFS due to use of PFS in the preparation of the polymer polyol, and (ii) chain transfer agent which is added separately from the preformed stabilizer to the preparation of the polymer polyol.

In the polymer polyols of the present invention, there are two potential and different sources of chain transfer agent (CTA). These two different sources of chain transfer agent account for 100% by weight of the chain transfer agent present. It should also be noted, however, that the actual compound used as chain transfer agent (i) may be the same or different than the actual compound used as chain transfer agent (ii). The difference between chain transfer agent (i) and chain transfer agent (ii) are explained in more depth below.

The first source of chain transfer agent (i) is the preformed stabilizer. As previously described, the preformed stabilizers of the present invention are prepared with a chain transfer agent. The preformed stabilizer, with the chain transfer agent, is then used to prepare the polymer polyol of the invention. The chain transfer agent that is used in the preparation of the preformed stabilizer is in turn "carried" or "transferred" by the PFS to the final product (i.e. the polymer polyol). Chain transfer agent which is present in the PFS will inherently exist in the polymer polyol produced from this PFS. This chain transfer agent (i) may be referred to as inherent CTA, PFS process CTA, or CTA from PFS.

The second source of chain transfer agent (ii) in the polymer polyols of the present invention is any chain transfer agent which is added separately to or used in the polymer polyol and/or the process of making the polymer polyol. In other words, chain transfer agent (ii) includes all sources of chain transfer agent, except that chain transfer agent (i) which is carried to the polymer polyol by the PFS. Chain transfer agent (ii) can be added as a separate component alone to the polymer polyol, added in combination with one or more other components which comprise the polymer polyol, or it can be blended with one (or more) of the other components (i.e. base polyol(s), ethylenically unsaturated monomer(s), and/or initiator(s)) in the preparation of the polymer polyol product. Obviously, it can not be blended or mixed with the PFS which used in the polymer polyol. This chain transfer agent (ii) may be referred to as added CTA and/or fresh CTA.

In one embodiment of the present invention, the total amount of chain transfer agent comprises (i) from greater than about 33% to 100% by weight, based on 100% by weight of (i) and (ii), of chain transfer agent from the preformed stabilizer and which is carried into the polymer polyol by the PFS, and (ii) from about 0% up to about 67% by weight, based on 100% by weight of (i) and (ii), of chain transfer agent that is added separately from the preformed stabilizer, to the preparation of the polymer polyol. In addition, the sum of the % by weight of chain transfer agent (i) and the % by weight of chain transfer agent (ii) totals 100% by weight of the total amount of chain transfer agent.

In accordance with the present invention, it is preferred that the total amount of chain transfer agent comprises (i) preferably from about 50% to about 100%, more preferably from about 75% to about 100%, most preferably from about 90% to about 100%, and most particularly preferably greater than about 95% to about 100% by weight, of chain transfer agent from the preformed stabilizer and which is carried into the polymer polyol by the PFS; and (ii) preferably from about 0% to about 50%, more preferably from about 0% to about 25%, most preferably from about 0% to about 10%, and most particularly preferably from about 0 to greater than about 5% by weight, of chain transfer agent that is added separately from the preformed stabilizer to the polymer polyol. As previously stated, the sum of the % by weight of chain transfer agent (i) and the % by weight of chain transfer agent (ii) totals 100% by weight of the total amount of chain transfer agent.

In a most particularly preferred embodiment of the present invention, the total amount of chain transfer agent (CTA) present in the polymer polyols of the present invention ranges from greater than about 5.0% to about 20% by weight, based on the total weight of the polymer polyol, and comprises (i) from greater than about 95% to about 100% by weight, based on 100% by weight of (i) and (ii), of chain transfer agent from the preformed stabilizer, and (ii) from about 0 up to about 5% by weight, based on 100% by weight of (i) and (ii), of chain transfer agent that is added separately from that in the preformed stabilizer, to the preparation of the polymer polyol. In addition, the sum of the % by weight of chain transfer agent (i) and the % by weight of chain transfer agent (ii) totals 100% by weight of the total amount of chain transfer agent.

The polymer polyols are preferably produced by utilizing a low monomer to polyol ratio which is maintained throughout the reaction mixture during the process. This is achieved by employing conditions that provide rapid conversion of monomer to polymer. In practice, a low monomer to polyol ratio is maintained, in the case of semi-batch and continuous operation, by control of the temperature and mixing conditions and, in the case of semibatch operation, also by slowly adding the monomers to the polyol.

The temperature range is not critical and may vary from about 80° C. to about 150° C. or perhaps greater, the preferred range being from about 90° C. to about 140° C., more preferably from about 100° C. to about 135° C., and most preferably from about 110° C. to about 130° C. As has been noted herein, the catalyst and temperature should be selected so that the catalyst has a reasonable rate of decomposition with respect to the hold-up time in the reactor for a continuous flow reactor or the feed time for a semi-batch reactor.

The mixing conditions employed are those obtained using a back mixed reactor (e.g.—a stirred flask or stirred autoclave). The reactors of this type keep the reaction mixture relatively homogeneous and so prevent localized high monomer to polyol ratios such as occur in tubular reactors when such reactors are operated with all the monomer added to the beginning of the reactor.

The polymer polyols of the present invention comprise dispersions in which the polymer particles (the same being either individual particles or agglomerates of individual particles) are relatively small in size and, in the preferred embodiment, have a weight average size less than about ten microns. However, when high contents of styrene are used, the particles will tend to be larger; but the resulting polymer polyols are highly useful, particularly where the end use application requires as little scorch as possible.

In accordance with the present invention, all of the stable, ultra-high solids product (viz. 100%) will pass through the filter employed in the 150 mesh filtration hindrance (filterability) test, and an exceptionally high amount of the product will pass through a 700 mesh screen. It is preferred that at least 99% pass through a 700 mesh screen, and more preferred that at least 100% pass through a 700 mesh screen. In accordance with the present invention, 100% of the product should pass through the 700 mesh screen. The 150 mesh filtration and 700 mesh filtration tests are described in U.S. Pat. No. 5,196,476, the disclosure of which is herein incorporated by reference.

This insures that the polymer polyol products can be successfully processed in all types of the relatively sophisticated machine systems now in use for large volume production of polyurethane products, including those employing impingement-type mixing which necessitate the use of filters that cannot tolerate any significant amount of relatively large particles. In addition, a significant amount of the polymer polyol passes the 700 mesh filtration hindrance test, as characterized more fully in the examples. It should be appreciated that the 700 mesh filtration hindrance test presents the most rigorous test of polymer polyol stability.

The following examples further illustrate details for the preparation and use of the compositions of this invention. The invention, which is set forth in the foregoing disclosure, is not to be limited either in spirit or scope by these examples. Those skilled in the art will readily understand that known variations of the conditions and processes of the following preparative procedures can be used to prepare these compositions. Unless otherwise noted, all temperatures are degrees Celsius and all parts and percentages are parts by weight and percentages by weight, respectively.

Examples

The following components were used in the working examples of this invention.

| | |
|---|---|
| Polyol A: | A polyol made by reacting propylene oxide and ethylene oxide with sorbitol in the presence of potassium hydroxide catalyst and refining to remove catalyst. The polyol contains about 16 weight percent ethylene oxide as a cap and has a hydroxyl number of about 28. |
| Polyol B: | A polyol made by reacting propylene oxide and ethylene oxide with sorbitol in the presence of potassium hydroxide catalyst and refining to remove catalyst. The polyol contains about 8 weight percent ethylene oxide as an internal blockand has a hydroxyl number of about 28. |
| Polyol C: | Polyalkylene oxide triol produced by reaction of ethylene oxide with glycerine to an equivalent weight of about 330. It is about 90% ethylene oxide. |
| Polyol D: | A polyol made by reacting propylene oxide and ethylene oxide with glycerol and sorbitol in the presence of potassium hydroxide catalyst and refining to remove catalyst. The polyol contains about 19 weight percent ethylene oxide as a cap and has a hydroxyl number of about 32. |
| Base Polyol A: | A polyol made by reacting propylene oxide and ethylene oxide successively with glycerol in the presence of potassium hydroxide catalyst and refining to remove catalyst. The polyol contains about 19 weight percent ethylene oxide as a cap and has hydroxyl number of about 36, and a viscosity of about 830 cSt. |

-continued

| | |
|---|---|
| Base Polyol B: | A polyol made by reacting propylene oxide and ethylene oxide with glycerol in the presence of potassium hydroxide catalyst and refining to remove catalyst. The polyol contains about 10 weight percent internal ethylene oxide and has a hydroxyl number of about 52, and a viscosity of about 500 cSt. |
| Base Polyol C: | A polyol made by reacting propylene oxide and ethylene oxide with glycerol in the presence of double metal cyanide complex catalyst. The polyol contains about 12 weight percent internal ethylene oxide and has a hydroxyl number of about 52, and a viscosity of about 510 cSt. |
| MDI: | A methylene diphenyl diisocyanate based material having an NCO group content of about 33.6%, a functionality of 2, and containing about 57% by wt. of the 2,4'-isomer |
| TMI: | Isopropenyl dimethyl benzyl isocyanate (an unsaturated aliphatic isocyanate) sold as TMI by Cytec Industries |
| Initiator A: | Azobis 2-methylpropanenitrile, a free-radical polymerization initiator commercially available as VAZO 64 from E. I. Du Pont de Nemours and Co. |
| Initiator B: | Azobis 2-methylbutyronitrile, a free-radical polymerization initiator commercially available as VAZO 67 from E. I. Du Pont de Nemours and Co. |
| Initiator C: | Tertiary amyl peroxypivalate, a free-radical polymerization initiator commercially available from Atofina under the trade name Luperox 554M75 |
| Initiator D: | 3-hydroxy-1,1-dimethylbutyl peroxy-2-ethylhexanoate, a free-radical polymerization initiator commercially available from Atofina under the trade name Luperox 665M50 |
| Initiator E: | Tertiary amyl peroxy-2-ethylhexanoate, a free-radical polymerization initiator commercially available from Atofina under the trade name Luperox 575 |
| Initiator F: | Lauroyl peroxide, a free-radical polymerization initiator commercially available from Atofina under the trade name Luperox LP |
| Initiator G: | Tertiary butyl peroxy-2-ethylhexanoate, a free-radical polymerization initiator commercially available from Atofina under the trade name t-Butyl Peroctoate |
| Catalyst A: | A polyurethane amine catalyst suitable for foams, sold by Dow Chemical Company as NIAX Catalyst A-1 |
| Catalyst B: | A polyurethane amine catalyst suitable for foams, sold by Dow Chemical Company as NIAX Catalyst C-183 |
| Catalyst C: | A polyurethane amine catalyst suitable for foams, sold by GE Silicones as NIAX Catalyst A-33 |
| Catalyst D: | A polyurethane tin catalyst suitable for foams, sold by Goldschmidt as K-29 |
| Surfactant A: | A silicone surfactant sold for use in foam by GE Silicones as L-620 |
| Surfactant B: | A silicone surfactant sold for use in foam by GE Silicones as U-2000 |
| Surfactant C: | A silicone surfactant sold for use in foam by Air Products as DC-5043 |
| Viscosity: | Kinematic viscosity measured by Cannon Fenske viscometer (cSt) |
| Filter-ability: | Filterability is determined by diluting one part by weight sample (e.g., 200 grams) of polymer polyol with two parts by weight of anhydrous isopropanol (e.g., 400 grams) to remove any viscosity-imposed limitations and using a fixed quantity of material in relation to a fixed cross-sectional area of screen (e.g., 1⅛ in. diameter), such that all of the polymer/polyol and isopropanol solution passes by gravity through a 150-mesh or 700-mesh screen. The 150-mesh screen has a square mesh with average mesh opening of 105 microns, and it is a "Standard Tyler" 150 square-mesh screen. The 700-mesh screen is made with a Dutch twill weave. The actual screen used had a nominal opening of 30 microns. The amount of sample, which passes through the screen within 1200 seconds, is reported in percent, a value of 100 percent indicates that over 99 weight percent passes through the screen. |

MACROMER PREPARATION:

| | |
|---|---|
| Macromer A: | Prepared by heating Polyol A (100 parts), TMI (0.5 part), MDI (0.5 parts) and 100 ppm stannous octoate catalyst at 75° C. for 2 hours. |
| Macromer B: | Prepared by heating Polyol B (100 parts), TMI (2 parts), and 100 ppm stannous octoate catalyst at 75° C. for 2 hours. |
| Macromer C: | Prepared by heating Polyol A (100 parts), TMI (2 parts), MDI (0.5 parts) and 100 ppm stannous octoate catalyst at 75° C. for 2 hours. |
| Macromer D: | Prepared by heating Polyol B (100 parts), maleic anhydride (1 part), ethylene oxide (1.5 moles of ethylene oxide per mole of maleic anhydride) and 60 ppm potassium hydroxide catalyst at 80° C. The reaction mixture was further isomerized with morpholine. After the reaction was completed, the excess oxide was removed by stripping under vacuum. |
| Macromer E: | Isophorone diisocyanate (2 equivalents), T-12 catalyst (300 ppm), and 1,4-benzoquinone (500 ppm) were charged to a well-mixed reaction vessel and heated to 50° C. The HEMA (1 equivalent) was then added and the reaction mixture was stirred for 1.5 hours to a constant free NOC content (5.9% NCO) to prepare the HEMA/IPDI adduct. 3000 g of polyol (Polyol A or Polyol B) was charged to a well-mixed reaction vessel and heated to 45° C. HEMA/IPDI adduct (97 g) and 100 ppm stannous octoate catalyst were then added and the reaction mixture was stirred at 75° C. for two hours. In some cases, MDI was added prior to adding HEMA/IPDI adduct to promote polyol coupling. |
| Macromer F: | Methacrylic acid (0.65 mole) was reacted with 1 mole of polyol (Polyol A or Polyol B) via azeotropic esterification using 0.1% by weight p-toluene sulfonic acid and toluene as a solvent. Toluene and residual methacrylic acid was removed via vacuum distillation to give the final product. The measured molar ratio was 0.45 mole methacrylate/mole polyol. |
| Macromer G: | Methyl methacrylate (0.35 mole) was reacted with Polyol A or Polyol B (0.58 mole) at 205° C. in the presence of titanium butoxide catalyst (200 ppm). A fractional distillation column was used to keep acrylate in the flask while allowing methanol to distill over. The resulting mixture was then vacuum stripped at 180° C. to remove residual methanol and methyl methacrylate. The measured molar ratio was 0.40 moles acrylate/mole polyol. |

High-Potency Preformed Stabilizer (PFS) Preparation:

The pre-formed stabilizer was prepared in a two-stage reaction system comprising a continuously-stirred tank reactor (CSTR) fitted with an impeller and 4 baffles (first-stage) and a plug-flow reactor (second stage). The residence time in each reactor was about 50 minutes. The reactants were pumped continuously to the reactor from feed tanks through an in-line static mixer and then through a feed tube into the reactor, which was well mixed. The temperature of the reaction mixture was controlled at 120±1° C. The product from the second-stage reactor overflowed continuously through a pressure regulator designed to control the pressure in each stage at 65 psig. The pre-formed stabilizer then passed through a cooler and into a collection vessel. The preformed stabilizer formulations are disclosed in Table 1.

TABLE 1

Preformed Stabilizers A through G

|  | PFS A | PFS B | PFS C | PFS D | PFS E | PFS F | PFS G |
|---|---|---|---|---|---|---|---|
| Chain Transfer Agent | Isopropanol | Isopropanol | Isopropanol | Isopropanol | Isopropanol | Isopropanol | Isopropanol |
| Chain Transfer Agent conc. in feed, wt % | 60.00% | 60.00% | 60.00% | 60.00% | 60.00% | 60.00% | 60.00% |
| Macromer type | A | B | C | D | E | F | G |
| Macromer concentration in feed, wt % | 24.00% | 24.00% | 24.00% | 24.00% | 24.00% | 24.00% | 24.00% |
| Monomers concentration in feed, wt % | 15.90% | 15.90% | 15.90% | 15.90% | 15.90% | 15.90% | 15.90% |
| Styrene/acrylonitrile ratio in feed, % | 50/50 | 50/50 | 50/50 | 50/50 | 50/50 | 50/50 | 50/50 |
| Initiator G concentration in feed, wt % | 0.10% | 0.10% | 0.10% | 0.10% | 0.10% | 0.10% | 0.10% |

Polymer Polyol Preparation:

This series of examples relates to the preparation of polymer polyols. The polymer polyols were prepared in a two-stage reaction system comprising a continuously-stirred tank reactor (CSTR) fitted with an impeller and 4 baffles (first-stage) and a plug-flow reactor (second stage). The residence time in each reactor was about 60 minutes. The reactants were pumped continuously from feed tanks through an in-line static mixer and then through a feed tube into the reactor, which was well mixed. The temperature of the reaction mixture was controlled within 1° C. of the target. The product from the second-stage reactor overflowed continuously through a pressure regulator designed to control the pressure in each stage at 45 psig. The polymer polyol then passed through a cooler and into a collection vessel. The crude product was vacuum stripped to remove volatiles. The amount of total polymer in the product (wt %) was calculated from the concentrations of unreacted monomers measured in the crude polymer polyol before stripping. Tables 2A and 2B show the composition and properties of polymer polyol Example 1 through Example 16.

TABLE 2A

Polymer Polyol Examples 1 through 8

| | Example No. | | | | | | | |
|---|---|---|---|---|---|---|---|---|
| | 1 | 2 | 3 | 4 | 5 | 6 | 7 | 8 |
| Base Polyol Type | B | B | A | A | B | B | B | B |
| PFS Type | B | B | C | A | B | B | D | E |
| Initiator Type | C | C | C | C | C | A | C | A |
| Preparation Conditions: | | | | | | | | |
| Reaction Temp | 125 | 125 | 125 | 125 | 125 | 125 | 125 | 120 |
| Initiator Conc. in Total Feed, wt % | 0.19 | 0.19 | 0.19 | 0.19 | 0.19 | 0.25 | 0.19 | 0.25 |
| Macromer Conc. in Total Feed, wt % | 2.65 | 2.65 | 2.75 | 2.75 | 3.8 | 2.75 | 2.75 | 3 |
| CTA Conc. in Total Feed, wt % | 6.63 | 6.63 | 6.88 | 6.88 | 9.5 | 6.88 | 6.88 | 7.5 |

TABLE 2A

Polymer Polyol Examples 1 through 8 - Continued: Properties

| | Example No. | | | | | | | |
|---|---|---|---|---|---|---|---|---|
| | 1 | 2 | 3 | 4 | 5 | 6 | 7 | 8 |
| Total Solids in Product* (wt %) | 61.99 | 62.11 | 60.82 | 62.25 | 69.54 | 65.15 | 62.91 | 64.21 |

TABLE 2A-continued

Polymer Polyol Examples 1 through 8 - Continued: Properties

| | Example No. | | | | | | | |
|---|---|---|---|---|---|---|---|---|
| | 1 | 2 | 3 | 4 | 5 | 6 | 7 | 8 |
| Ratio of Polystyrene to Polyacrylonitrile | 65.4/34.6 | 65.5/34.5 | 64/36 | 63.5/36.5 | 65.8/34.2 | 65.1/34.9 | 65.3/34.7 | 65.2/34.8 |
| Viscosity (cSt) | 14536 | 15177 | 93622 | 25131 | 58510 | 20816 | 23419 | 23867 |
| Filterability: | | | | | | | | |
| % through 150-mesh screen | 100 | 100 | 100 | 100 | 100 | 100 | 100 | 100 |
| ppm on 150-mesh screen | 3 | 12 | 4 | 3 | 7 | 1 | 11 | 22 |
| % through 700-mesh screen | 100 | 100 | 100 | 100 | 100 | 100 | 100 | 100 |
| Time through 700-mesh screen (sec) | 222 | 181 | 207 | 157 | 197 | 204 | 1013 | 248 |

*calculated

TABLE 2B

Polymer Polyol Examples 9 through 16

| | Example No. | | | | | | | |
|---|---|---|---|---|---|---|---|---|
| | 9 | 10 | 11 | 12 | 13 | 14 | 15 | 16 |
| Base Polyol Type | B | B | B | B | C | C | B | B |
| PFS Type | E | F | B | B | B | B | B | B |
| Initiator Type | D | A | F | E | A | A | B | C |
| Preparation Conditions: | | | | | | | | |
| Reaction Temp | 125 | 120 | 125 | 125 | 115 | 115 | 125 | 120 |
| Initiator Conc. in Total Feed, wt % | 0.21 | 0.32 | 0.31 | 0.17 | 0.25 | 0.25 | 0.5 | 0.5 |
| Macromer Conc. in Total Feed, wt % | 3 | 2.75 | 2.85 | 2.7 | 1.8 | 2.75 | 3 | 3 |
| CTA Conc. in Total Feed, wt % | 7.5 | 6.88 | 7.13 | 6.75 | 5 | 7 | 7.5 | 7.5 |

TABLE 2B

Polymer Polyol Examples 9 through 16 - Continued: Product Properties

| | Example No. | | | | | | | |
|---|---|---|---|---|---|---|---|---|
| | 9 | 10 | 11 | 12 | 13 | 14 | 15 | 16 |
| Total Solids in Product* (wt %) | 60.78 | 63.38 | 61.45 | 61.55 | 60.19 | 70.13 | 63.41 | 62.35 |
| Ratio of Polystyrene to Polyacrylonitrile | 65.4/34.6 | 64.9/35.1 | 67.1/32.9 | 61.6/38.4 | 65.3/34.7 | 65.4/34.6 | 66.8/33.2 | 65/35 |
| Viscosity (cSt) | 18822 | 15718 | 14026 | 14897 | 11959 | 50334 | 17720 | 21123 |
| Filterability: | | | | | | | | |
| % through 150-mesh screen | 100 | 100 | 100 | 100 | 100 | 100 | 100 | 100 |
| ppm on 150-mesh screen | 28 | 9 | 0 | 1 | 2 | 0 | 9 | 6 |
| % through 700-mesh screen | 100 | 100 | 100 | 100 | 100 | 100 | 100 | 100 |

TABLE 2B-continued

Polymer Polyol Examples 9 through 16 - Continued: Product Properties

| | Example No. | | | | | | | |
|---|---|---|---|---|---|---|---|---|
| | 9 | 10 | 11 | 12 | 13 | 14 | 15 | 16 |
| Time through 700-mesh screen (sec) | 240 | 600 | 340 | 157 | 254 | 244 | 346 | 174 |

*calculated

Polyurethane Foam Preparation:

The next series of examples relates to the preparation of foams from above polymer polyols. Polymer Polyols of Example 1 and Example 2 were used to prepare following foams (Foam 1 through Foam 4) in two different foam formulations. The basic formulation used to prepare Foams 1-4 is as follows. The polymer polyol, an optional base polyol, an amine catalyst (Catalyst A or Catalyst B), water, and a silicone surfactant (Surfactant A or Surfactant B) were added to a one-half gallon cylindrical container fitted with baffles. The contents were mixed at 2400 rpm for 60 seconds with an agitator having two turbine impellers. The mixture was then degassed for 15 seconds. After degassing, Catalyst D was added and the contents mixed at 2400 rpm for 10 seconds. While the mixer was still rotating, toluene diisocyanate was added and the contents were mixed for 5 seconds. The mixture was then poured into a 14 by 14 by 6-inch cardboard box, where it rose freely until the reaction was complete. The foam was then heated in an oven at 125° C. for 5 minutes. Foam properties were determined according to ASTM Standard D-3574-66.

TABLE 3A

Foam Formulations 1 through 4

| | Foam No. | | | |
|---|---|---|---|---|
| Polymer Polyol | 1<br>Example 1 | 2<br>Example 1 | 3<br>Example 2 | 4<br>Example 2 |
| Polymer polyol in Ex., pphp | 72.6 | 30.9 | 72.5 | 30.8 |
| Base polyol B, pphp | 27.4 | 11.7 | 27.5 | 11.8 |
| Polyol A, pphp | — | 56 | — | 56 |
| Polyol C, pphp | — | 1.4 | — | 1.4 |
| DEOA, pphp | — | 3 | — | 3 |
| Water, pphp | 2.3 | 3.25 | 2.3 | 3.25 |
| Catalyst A, pphp | 0.03 | — | 0.03 | — |
| Catalyst B, pphp | — | 0.1 | — | 0.1 |
| Catalyst D, pphp | 0.1 | 0.1 | 0.1 | 0.1 |
| Surfactant A, pphp | 0.45 | — | 0.45 | — |
| Surfactant B, pphp | — | 0.88 | — | 0.88 |
| TDI, pphp | 30.6 | 47.9 | 30.6 | 47.9 |
| Index | 115 | 110 | 115 | 110 |

"pphp" is parts per hundred based on the weight of the polyol components

TABLE 3B

Foam Properties 1 through 4

| | | Foam | | | |
|---|---|---|---|---|---|
| | | 1 | 2 | 3 | 4 |
| DENSITY | lb/cuft | 2.55 | 1.72 | 2.47 | 1.72 |
| RESILIENCY | % | — | 51.00 | — | 51.00 |
| IFD_25% | lbs | 134.21 | 28.87 | 136.90 | 26.97 |
| IFD_65% | lbs | 282.51 | 64.14 | 278.96 | 61.24 |
| IFD_25%_RT | lbs | 81.62 | 21.02 | 83.19 | 19.55 |
| ASTM_TENS | psi | 31.86 | 16.78 | 33.57 | 13.39 |
| ASTM_ELONG | % | 107.75 | 95.82 | 116.67 | 91.50 |
| ASTM_TEAR | lb/in | 2.64 | 1.25 | 2.54 | 1.25 |
| COMP_90 | % | 6.16 | 8.93 | 6.42 | 10.11 |
| HA_COMP_75 | % | — | 13.45 | — | 14.12 |
| WET_SET_50 | % | — | 29.19 | — | 32.50 |

Polymer Polyol of Example 4 was used to prepare Foams 5, 6 and 7. The basic formulation used to prepare Foams 5, 6 and 7 is as follows. The polymer polyol, optional base polyol(s), amine catalysts, water, DEOA and a silicone surfactant were added to a one-half gallon cylindrical container fitted with baffles. The contents were mixed at 2400 rpm for 60 seconds with an agitator having two turbine impellers. The mixture was then degassed for 60 seconds. Toluene diisocyanate (Modur TD-80) was added to the container and the contents were mixed at 2400 rpm for 5 seconds. The mixture was then poured into a preconditioned mold while shaking the mixing container to ensure that required amount was transferred to the mold. The mold was immediately clamped and sealed. The foam reaction proceeded for the prescribed demold time, after which the foam was demolded. The foam was aged for seven days at room temperature prior to measuring foam properties. Foam properties were determined according to ASTM Standards.

TABLE 4A

Foam Formulations 5, 6 and 7

| | Foam No. | | |
|---|---|---|---|
| Polymer Polyol | 5<br>Example 4 | 6<br>Example 4 | 7<br>Example 4 |
| Polymer polyol in Ex., pphp | 37.5 | 37.5 | 37.5 |
| Polyol D, pphp | 62.5 | 62.5 | 62.5 |
| DEOA, pphp | 1 | 1 | 1 |
| Water, pphp | 3.3 | 3.3 | 3.3 |
| Catalyst A, pphp | 0.08 | 0.08 | 0.08 |
| Catalyst C, pphp | 0.32 | 0.32 | 0.32 |

TABLE 4A-continued

Foam Formulations 5, 6 and 7

| Polymer Polyol | Foam No. | | |
|---|---|---|---|
| | 5 Example 4 | 6 Example 4 | 7 Example 4 |
| Surfactant C, pphp | 1 | 1 | 1 |
| TDI, pphp | 38.8 | 38.8 | 38.8 |
| Index | 100 | 100 | 100 |

"pphp" is parts per hundred based on the weight of the polyol components

TABLE 4B

Foam Properties of Foam 5, 6 and 7

| | Units | Foam 5 | 6 | 7 |
|---|---|---|---|---|
| DENSITY | Lbs/CuFt | 2.45 | 2.46 | 2.47 |
| RESILIENCY | % | 62 | 61 | 61 |
| ASTMIFD_HT | In | 3.92 | 3.92 | 3.9 |
| IFD_25% | Lbs | 60.61 | 63.64 | 62.69 |
| IFD_50% | Lbs | 107.06 | 110.46 | 109.66 |
| IFD_65% | Lbs | 162.85 | 165.87 | 164.61 |
| IFD_25%_RT | Lbs | 45.24 | 47.3 | 46.7 |
| RETURN_VAL | % | 74.64 | 74.32 | 74.49 |
| IFD_50/25 | | 1.77 | 1.74 | 1.75 |
| IFD_65/25 | | 2.69 | 2.61 | 2.63 |
| CFD_50% | Psi | 0.48 | 0.51 | 0.53 |
| ASTM_TENS | Psi | 30.74 | 30.77 | 28.34 |
| ASTM_ELONG | % | 114.57 | 116.14 | 106.85 |
| ASTM_TEAR | Lb/In | 1.87 | 1.71 | 1.87 |
| COMP_50% | % | 16.41 | 15.69 | 15.22 |
| WET_SET_50 | % | 14.49 | 13.39 | 14.69 |

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A, stable, ultra-high solids polymer polyol composition, comprising the reaction product of:
   (A) a base polyol;
   (B) from 7.5% to 35% by weight, based on 100% by weight of the polymer polyol, of a high potency preformed stabilizer which comprises
      (1) a macromer or precursor which comprises an adduct of an alcohol corresponding to the average formula:

A(OROX)$_{\geq 1}$, wherein:
      A represents a polyvalent organic moiety which has a free valence $\geq 1$,
      R represents the divalent residue comprising an alkylene oxide moiety,
      and
      X represents one or more of an organic moiety containing reactive unsaturation which is copolymerizable with A and hydrogen and one of such X is the organic moiety containing reactive unsaturation and the remaining X's are hydrogen;
      (2) at least one free-radically polymerizable ethylenically unsaturated monomer,
      (3) a free-radical initiator,
      and
      (4) a liquid diluent comprising a monol;
      and
   (C) at least one ethylenically unsaturated monomer;
   in the presence of
   (D) at least one free-radical polymerization initiator;
   and
   (E) a chain transfer agent;
   wherein the polymer polyol has a solids content greater than 60% by weight, and the polymer polyol has a kinematic viscosity less than or equal to (X $e^{[-4.5 \times LN(1-(Y/100))]}$)
   wherein:
   X: represents the kinematic viscosity of the base polyol,
   Y: represents the total solids content expressed as weight percent,
   LN: represents the logarithm to natural base,
   and the polymer polyol has product stability such that essentially 100% passes through a 150 mesh screen and at least about 99% passes through a 700 mesh screen.

2. The polymer polyol of claim 1, wherein the solids content ranges from greater than 60 to about 85% by weight.

3. The polymer polyol of claim 1, wherein the solids content is from greater than 60 to about 82% by weight.

4. The polymer polyol of claim 1, wherein the product stability is such that at least 99.5% passes through a 700 mesh screen.

5. The polymer polyol of claim 1, wherein (D) said free-radical initiator is selected from the group consisting of peroxide initiators, azo initiators and mixtures thereof.

6. The polymer polyol of claim 5, wherein (D) said free-radical initiator is a peroxide initiator selected from the group consisting of: tert-amyl peroxypivalate, tert-butyl peroxypivalate, tert-butyl peroxydiethylacetate, dilauroyl peroxide, dioctanoyl peroxide, didecanoyl peroxide, didodecanoyl peroxide, 2,5-dimethyl-2,5-di(2-ethylhexanoylperoxy)hexane, tert-amyl peroxy-2-ethyl hexanoate, tert-butyl peroxy-2-ethyl hexanoate, dibenzoyl peroxide, 1,1,3,3-tetramethylbutyl peroxypivalate, di(3,5,5-trimethylhexanoyl)peroxide, 1,1,3,3-tetramethylbutyl peroxy-2-ethylhexanoate, 1,1-dimethyl-3-hydroxybutyl peroxy-2-ethylhexanoate and mixtures thereof.

7. The polymer polyol of claim 5, wherein (D) said free-radical initiator is an azo initiator selected from the group consisting of: 2,2-azobis(isobutyronitrile), 2,2'-azobis(2-methylbutyronitrile) and mixtures thereof.

8. The polymer polyol of claim 1, wherein (C) said ethylenically unsaturated monomer is selected from the group consisting of acrylonitrile, styrene, dibromostyrene, vinylidene chloride and mixtures thereof.

9. The polymer polyol of claim 8, wherein said ethylenically unsaturated monomers comprise styrene and acrylonitrile in a weight ratio of from 100:0 to 40:60.

10. The polymer polyol of claim 1, wherein (B) (1) said macromer or precursor which comprises an adduct of an alcohol is further reacted with an organic polyisocyanate.

11. The polymer polyol of claim 1, wherein the total amount of (E) chain transfer agents ranges from about 0.1% to 30% by weight, based on the weight of the polymer polyol.

12. The polymer polyol of claim 1, wherein said base polyol has an OH number of from 10 to 1,000 and a functionality of from 2 to 8.

13. A process for preparing a stable, ultra-high solids polymer polyol, comprising:

(1) free-radically polymerizing:
(A) a base polyol,
(B) from 7.5% to 35% by weight, based on 100% by weight of the polymer polyol, of a high potency preformed stabilizer which comprises
(1) a macromer or precursor which comprises an adduct of an alcohol corresponding to the average formula:

$A(OROX)_{\geq 1}$, wherein:
A represents a polyvalent organic moiety which has a free valence $\geq 1$,
R represents the divalent residue comprising an alkylene oxide moiety, and
X represents one or more of an organic moiety containing reactive unsaturation which is copolymerizable with A and hydrogen and one of such X is the organic moiety containing reactive unsaturation and the remaining X's are hydrogen;
(2) at least one free-radically polymerizable ethylenically unsaturated monomer,
(3) a free-radical initiator, and
(4) a liquid diluent comprising a monol; and
(C) at least one ethylenically unsaturated monomer, in the presence of:
(D) at least one free-radical polymerization initiator, and
(E) a chain transfer agent;
wherein the polymer polyol has a solids content greater than 60% by weight, and the polymer polyol has a kinematic viscosity less than or equal to $(X\ e^{[-4.5 \times LN(1-Y/100)]})$ wherein:
X: represents the kinematic viscosity of the base polyol,
Y: represents the total solids content expressed as weight percent,
LN: represents the logarithm to natural base,
and the polymer polyol has product stability such that essentially 100% passes through a 150 mesh screen and at least about 99% passes through a 700 mesh screen.

14. The process of claim 13, wherein the solids content ranges from greater than 60% to about 85% by weight.

15. The process of claim 13, wherein the solids content ranges from greater than 60% to about 82% by weight.

16. The process of claim 13, wherein the product stability is such that at least 99.5% passes through a 700 mesh screen.

17. The process of claim 13, wherein (D) said free-radical initiator is selected from the group consisting of peroxide initiators, azo initiators, and mixtures thereof.

18. The process of claim 17, wherein (D) said free-radical initiator is a peroxide initiator selected from the group consisting of: tert-amyl peroxypivalate, tert-butyl peroxypivalate, tert-butyl peroxydiethylacetate, dilauroyl peroxide, dioctanoyl peroxide, didecanoyl peroxide, didodecanoyl peroxide, 2,5-dimethyl-2,5-di(2-ethylhexanoylperoxy)hexane, tert-amyl peroxy-2-ethyl hexanoate, tert-butyl peroxy-2-ethyl hexanoate, dibenzoyl peroxide, 1,1,3,3-tetramethylbutyl peroxypivalate, di(3,5,5-trimethylhexanoyl)peroxide, 1,1,3,3-tetramethylbutyl peroxy-2-ethylhexanoate, 1,1-dimethyl-3-hydroxybutyl peroxy-2-ethylhexanoate and mixtures thereof.

19. The process of claim 17, wherein (D) said free-radical initiator is an azo initiator selected from the group consisting of: 2,2-azobis(isobutyronitrile), 2,2'-azobis(2-methylbutyronitrile) and mixtures thereof.

20. The process of claim 13, wherein (C) said ethylenically unsaturated monomer is selected from the group consisting of acrylonitrile, styrene, dibromostyrene, vinylidene chloride and mixtures thereof.

21. The process of claim 20, wherein said ethylenically unsaturated monomers comprise styrene and acrylonitrile in a weight ratio of from 100:0 to 40:60.

22. The process of claim 13, wherein (B)(1) said macromer or precursor which comprises an adduct of an alcohol is further reacted with an organic polyisocyanate.

23. The process of claim 13, wherein the total amount of (E) chain transfer agents ranges from about 0.1% to 30% by weight, based on the weight of the polymer polyol.

24. The process of claim 13, wherein said base polyol has a functionality of 2 to 8 and an OH number of from 10 to 1,000.

25. The process of claim 13, wherein the polymerization is at a temperature of 80 to 150° C.

* * * * *